Figure 1:
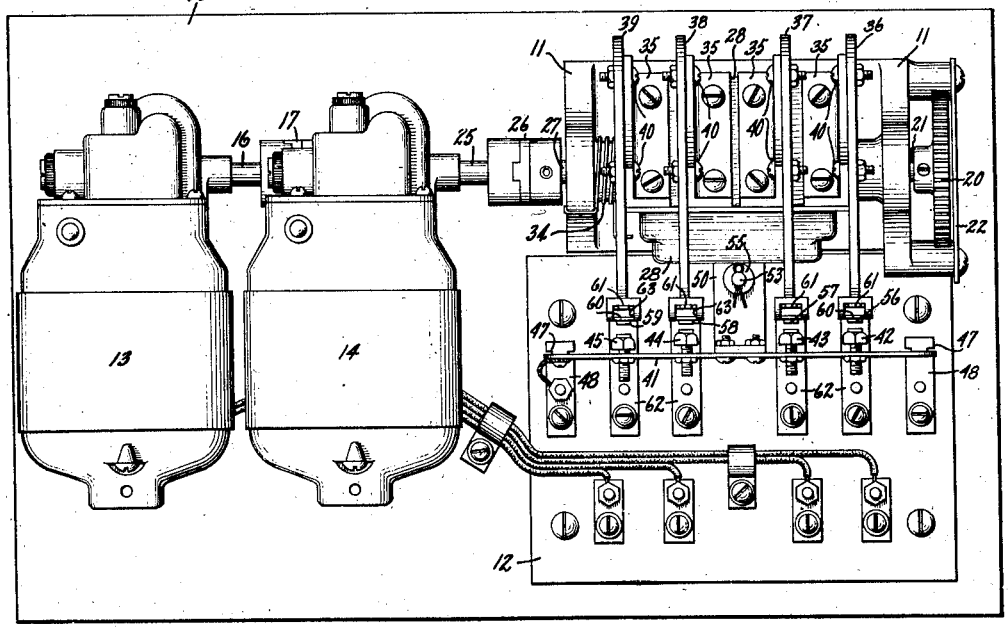

June 8, 1937.  B. W. JONES  2,083,531
CONTROL MEANS
Filed Nov. 28, 1936  2 Sheets—Sheet 1

Inventor:
Benjamin W. Jones,
by Harry E. Dunham
His Attorney.

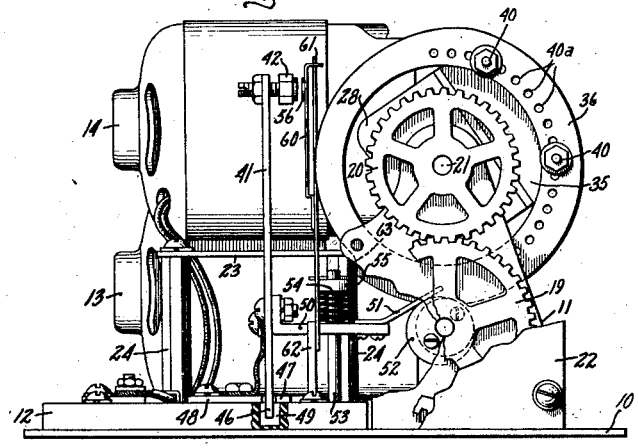

Patented June 8, 1937

2,083,531

UNITED STATES PATENT OFFICE 2,083,531

CONTROL MEANS

Benjamin W. Jones, Schenectady, N. Y., assignor to General Electric Company, a corporation of New York Application November 28, 1936, Serial No. 113,167

11 Claims. (Cl. 172—274)

My invention relates to control means, more particularly to differential control means for maintaining substantially constant a condition to be controlled and has for an object the provision of simple, reliable, and inexpensive control means of this character.

In the application of electric motors, particularly asynchronous alternating current motors, to various types of machinery, for example, to printing press drives, it is often desirable to maintain a relatively low speed during certain portions of the operation. This low speed may be on the order of 10% speed and since the load may vary over wide limits, it is essential that means be provided for varying the secondary or rotor resistance of the driving motor over a wide range.

Various control devices have heretofore been proposed for accomplishing such speed control of asynchronous alternating current motors. While some of these devices have been found relatively satisfactory, they likewise have been found objectionable from the standpoint of cost and have been subject to operating and installation difficulties.

Accordingly, it is a further object of my invention to provide simple and reliable speed control means for an induction motor arranged to maintain a substantially constant low speed.

In carrying out my invention in one form, I provide a plurality of contacts mounted for vibratory movement and a plurality of co-operating contacts normally positioned beyond and selectively movable into the range of vibration so as to provide selective intermittent engagement of the contacts. In addition, means responsive to the condition to be controlled are provided for moving the co-operating contacts into and out of the range of vibration and means controlled by the selective engagement and disengagement of the contacts are provided for varying the condition to be controlled.

More specifically, I provide a pair of small auxiliary motors respectively energizable from the primary and secondary circuits of a wound rotor induction motor the speed of which is to be controlled, and a differential mechanism driven by these auxiliary motors is provided for moving the co-operating contacts into and out of the range of vibration in accordance with variations in the speed of the induction motor. Means controlled by engagement and disengagement of the contacts are provided for varying the secondary resistance of the induction motor to control its speed, the intermittent engagement of the controlling contacts preventing overshooting of this resistance controlling means.

The duration of contact engagement during each vibration of the contacts increases gradually as the co-operating contacts are moved by the differential mechanism and each co-operating contact is arranged to provide continuous engagement with its associated vibrating contact before the next co-operating contact is moved into the range of vibration. Furthermore, the cams which are operated by the differential mechanism to drive the co-operating contacts are adjustably secured to the differential mechanism so as to provide for variation in the sequential movement of the co-operating contacts.

Figure 2:
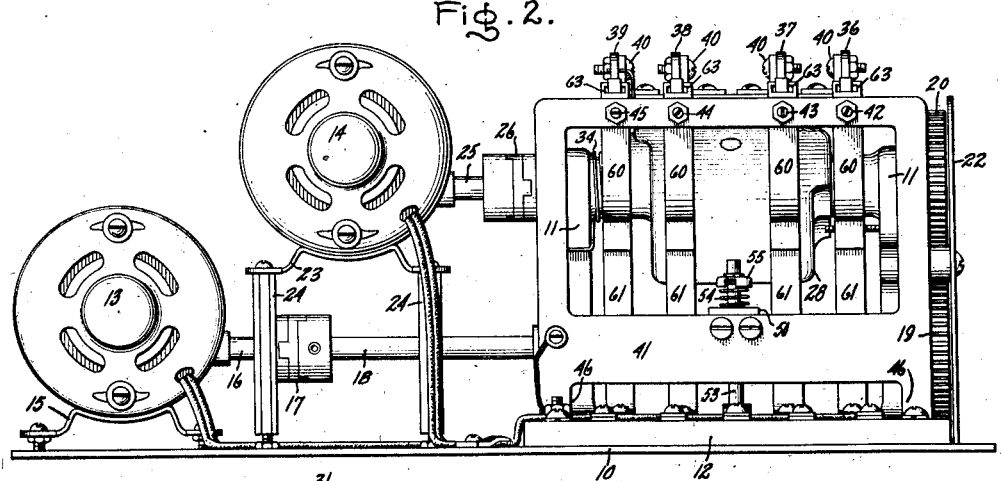
Figure 3:
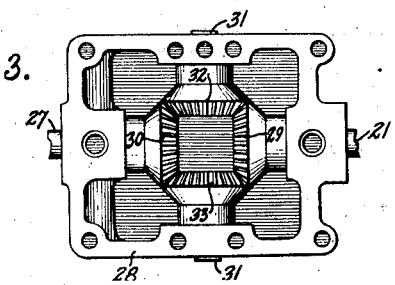

For a more complete understanding of my invention, reference may now be had to the drawings in which Fig. 1 is a plan view of a control device embodying my invention; Fig. 2 is an elevational view of the device shown in Fig. 1; Fig. 3 is a fragmentary view of the differential mechanism with a portion of the casing removed to illustrate the internal gearing; Fig. 4 is an end view of the device shown in Fig. 1 with certain parts broken away; and Fig. 5 is a somewhat diagrammatic view of the control device applied to the control of an induction motor.

Referring now to the drawings, I have shown my invention as applied to a control device comprising a base plate 10 to which a U-shaped frame 11 and an insulating base member 12 are secured for respectively supporting the differential mechanism and the contact mechanism to be described hereinafter. Also mounted on the base plate 10 is a pair of small auxiliary motors 13 and 14 which may be any well known alternating current type of motor, the speed of which varies at constant load with the frequency of the source of alternating current supply. For example, the auxiliary motors are shown as fractional horse-power, single phase, shaded-pole induction motors.

As shown, the auxiliary motor 13 is mounted on a support 15 (Fig. 2) and is connected through suitable reduction gearing (not shown) to a shaft 16 coupled by means of a coupling 17 to a second shaft 18 which extends across and is journaled in the two legs of the U-shaped frame 11. Secured to the extending end of the shaft 18 is a gear 19 which meshes with a similar gear 20 mounted on the end of the differential shaft 21. As shown, the gears 19 and 20 are partially enclosed by means of a suitable cover plate 22. Likewise, the motor 14 is mounted on a support 23 carried by the supporting posts 24 and is connected by suitable reduction gearing (not shown)

to a shaft 25 which is connected by a coupling 26 to a differential shaft 27 journalled in one leg of the frame 11.

The differential shafts 21 and 27 rotatably support a differential housing 28 (Fig. 3) and are provided at their innermost ends with bevel gears 29 and 30, respectively. Meshing with the bevel gears 29 and 30 and journalled on suitable stub shafts 31 carried by the housing 28 is a pair of bevel gears 32 and 33. As will be understood by those skilled in the art, so long as the gears 30 and 29 rotate at the same speed, the gears 32 and 33 rotate on their shafts 31 and the housing 28 remains stationary. Whenever a differential occurs in the speed of gears 30 and 29, however, the gears 32 and 33, together with the housing 28, rotate about the shafts 21 and 27. Normally, the differential housing 28 is biased to the position shown by a torsion spring 34.

Secured to the upper external wall of the differential housing, I provide a plurality of brackets 35 which support a plurality of annular cams 36, 37, 38, and 39. These cams surround the housing 28 and are secured thereto in predetermined relation to each other by the screws 40 which extend through the brackets 35 and through suitable apertures 40a (Fig. 4) in the cams. As shown, each of the cams is provided with a plurality of apertures for permitting circumferential adjustment of the cams relative to the housing. As will be more fully explained hereinafter, rotation of the differential housing 28 and the consequent movement of the cams 36 to 39, inclusive, controls the contact mechanism carried on the insulating base 12.

This contact mechanism, as shown, comprises a tiltable frame 41, the upper side of which carries a plurality of adjustable contacts 42, 43, 44, and 45, respectively, and the lower side of which is provided with supporting legs 46. As shown best in Figs. 1, 4, and 5, these legs 46 are bifurcated and engage suitable notches 47, in a pair of supporting plates 48 which are secured to the face of the insulating base member 12, the base member 12 (Fig. 4) being provided with apertures 49 into which the bifurcated legs extend. Thus, the frame 41 is supported for pivotal movement on the base member 12.

Extending outwardly from the frame 41 is an arm 50, the outer end of which carries a cam follower 51 for engaging an eccentric cam 52 carried by the shaft 18. A guide post 53 which extends upwardly from the base 12 passes through a suitable aperture in the arm 50 and is provided with a spring 54, one end of which engages a washer 55 carried by the post 53 and the other end of which engages the arm 50 so as to maintain the cam follower 51 in engagement with the periphery of the eccentric cam 52. It will be apparent, therefore, that upon rotation of the shaft 18 the eccentric cam 52 imparts to the frame 41 and to the contacts 42 to 45, inclusive, a vibratory movement, the amplitude or range of which is determined by the shape of the eccentric and the frequency of which depends upon the speed of rotation of the shaft 18.

Disposed adjacent the pivoted frame 41, I provide a plurality of co-operating contacts 56, 57, 58, and 59, respectively, associated with the contacts 42 to 45, inclusive, and normally positioned beyond the range of vibratory movement thereof. These co-operating contacts are supported on suitable spring arms 60, which, as shown best in Fig. 4, are secured to intermediate portions of associated resilient supporting members 61, the lower ends of which are supported on L-shaped brackets 62 secured to the insulating base member 12, the upper ends of the resilient members 61 extending through suitable slots 63 (Figs. 1 and 2) formed in the rearwardly extending upper ends of the spring arms 60. Thus, it will be seen that each of the contacts 56 to 59, inclusive, is supported for limit movement relative to its associated resilient member 61 for a purpose to be more fully described hereinafter.

As shown, the resilient members 61 are positioned adjacent the cams 36 to 39, inclusive, so that upon rotation of the differential housing 28 in a counter-clockwise direction, the contacts 56 to 59, inclusive, will be moved toward the frame 41 and into the range of vibration of the contacts 42 to 45, inclusive, the cams 36 to 39, inclusive, being provided as shown with suitable high spots 63 to 66, respectively.

It will now be apparent that when the shaft 18 is rotated, the contacts 42 to 45, inclusive, are vibrated through a given range and that when the differential housing moves in a counterclockwise direction, as viewed in Fig. 5, the co-operating contacts 56 to 59, inclusive, will be sequentially moved into this range of vibration. The high spots on the cams 36 to 39, inclusive, are so arranged that the co-operating contact 56 first moves into the range of vibration and thus an intermittent engagement and disengagement of the contacts 42 and 56 is provided, the duration of which depends upon the distance that the contact 56 is moved. It will be apparent that as this contact 56 moves further, the duration of contact engagement increases, the arrangement of the spring arm 60 relative to the resilient support 61 being such that the cooperating contact 56 follows the contact 42 during a portion of its vibration.

When the contact 56 is moved to its extreme position by the high spot 63 on the cam 36, the contacts 42 and 56 remain continuously in engagement, the contact 56 following the contact 42 during its entire range of vibration. Preferably, the cams 36 and 37 are so arranged that the contact 56 reaches its position of continuous engagement before the contact 57 is moved into the range of vibration intermittently to engage the contact 43 and likewise the contacts 57 and 58 are moved to their respective positions of continuous engagement before the next succeeding contact is moved into the range of vibration.

As will be explained more fully hereinafter, the vibrating contacts 42 to 45, inclusive, and the co-operating contacts 56 to 59, inclusive, control suitable means for varying the condition to be controlled and the contact arrangement thus far described which provides first intermittent engagement of continually increasing duration and finally continuous engagement of the contacts is highly effective in preventing chattering of the contacts and in preventing over correction in the variation of the condition to be controlled.

It is now believed that a complete understanding of my invention may be had from a description of the operation of my improved control device when utilized to control the speed of an induction motor.

Referring now to Fig. 5, I have shown my improved control device as applied to an induction motor 67, the primary winding of which is connected for energization from a suitable source of 3-phase alternating current represented by the conductors 68, 69, and 70, and the secondary circuit of which is provided with a plurality of slip rings 71 and with co-operating brushes 72 to which a suitable speed controlling resistance is connected. As shown, this speed controlling resistance is divided into a plurality of sections 73, 74, 75, and 76, which sections are controlled by electromagnetic switches 77, 78, 79, and 80, respectively, associated therewith.

These electromagnetic switches are arranged, when operated, to short-circuit the associated resistor sections and are provided with energizing windings, the energization of which is controlled by the contacts 42 to 45, inclusive, and the contacts 56 to 59, inclusive, of my improved control device in a manner to be more fully described hereinafter.

As shown, the auxiliary motor 13 is connected, by means of the conductors 81, for energization from the same source of alternating current supply as the primary circuit of the induction motor 67, and the auxiliary motor 14 is connected across two of the slip rings 71 by means of the conductors 82 for energization in accordance with the secondary voltage of the induction motor 67. Thus, it will be seen that the auxiliary motor 13 rotates at a constant speed determined by the frequency of the alternating current supply so as to serve as a speed reference means and that the speed of the auxiliary motor 14 varies in accordance with the frequency of the current induced in the secondary circuit of the induction motor.

In the drawings, the control device is shown in the position occupied when the induction motor 67 is rotating at the desired low speed, say 10% speed, under minimum load conditions, all of the secondary resistor sections being included in the secondary circuit of the induction motor. So long as the induction motor 67 continues to operate at this speed, the auxiliary motors 13 and 14 drive their respective differential gears 29 and 30 at equal speeds and accordingly the differential housing 28 remains in the position shown.

It will now be assumed that the load on the induction motor 67 suddenly increases, and, as will be understood by those skilled in the art, an increase in the load on the induction motor 67 causes the motor to slow down. As the speed of the induction motor begins to decrease, however, the frequency of the current induced in its secondary circuit increases and accordingly the speed of the auxiliary motor 14 increases, whereupon the differential housing 28 is moved in a counterclockwise direction and the co-operating contact 56 is moved into the range of vibration of the contact 42 so as to provide intermittent engagement therebetween. As soon as the contact 56 engages the contact 42, an energizing circuit is established for the magnetic switch 80, which circuit may be traced from the supply conductor 70 through the conductor 83, the frame 41, the contacts 42 and 56, the members 60 and 61, which support the contact 56, the conductor 84, the energizing winding of the magnetic switch 80, and by way of the conductors 85, 86, 87, and 88 to the supply conductor 69.

It will be apparent that energization of the electromagnetic switch 80 short-circuits the resistor sections 76 so as to decrease the resistance in the secondary circuit of the induction motor 67. It will be assumed that the electromagnetic switch 80 operates quickly enough so that it opens and closes each time that the vibrating contact 42 engages and disengages the co-operating contact 56. Thus, a vibrating characteristic is obtained which decreases the resistance connected in the secondary circuit of the induction motor by an amount the average value of which depends upon the time during which the contacts 42 and 56 remain closed throughout each vibration of the contact 42. As the differential housing 28 continues to rotate in a counterclockwise direction, the duration of contact engagement between the contacts 42 and 56 increases, as described above, and accordingly the average value of the resistance in the secondary circuit of the induction motor 67 decreases so as to speed up the induction motor.

When the co-operating contact 56 reaches its position of continuous engagement, the electromagnetic switch 80 is continuously energized so as continuously to short-circuit the resistor section 76. If the removal of this amount of resistance from the secondary circuit is sufficient to increase the speed of the induction motor to the predetermined value, the speed of operation of the auxiliary motor 14 will be such that the differential gears 29 and 30 operate at equal speeds and accordingly the movement of the differential housing 28 will cease. If, however, the load variation on the induction motor 67 is such that the induction motor still operates at too low a speed, the differential housing 28 continues to rotate in a counterclockwise direction and the co-operating contact 57 is thus moved into the range of vibration of the contact 43 intermittently to energize the electromagnetic switch 79 and thereby remove the resistor sections 75 from the secondary circuit of the induction motor.

In a like manner, if the load on the induction motor should increase suddenly to its maximum value, the differential housing 28 would continue to rotate until all of the associated contacts were in their continuously closed position so as continuously to energize all of the electromagnetic switches 77 to 80, inclusive, and thereby short-circuit all of the resistor sections 73 to 76, inclusive. It will also be apparent that if the load on the induction motor 67 should then decrease, the induction motor would tend to speed up and the auxiliary motor 14 would slow down so as to effect rotation of the differential housing 28 in a clockwise direction and progressively open the associated contacts so as sequentially to insert the resistance sections 73 to 76, inclusive, in the secondary circuit of the induction motor 67.

In the above description, it has been assumed that the electromagnetic switches 77 to 80, inclusive, act quickly enough to follow the engagement and disengagement of the contacts controlling the energizing windings thereof. Substantially the same effect may be obtained, however, when slow acting electromagnetic switches are used. Such slow acting electromagnetic switches will respond to the average value of current flowing in their energizing circuit, which current value is determined by the duration of contact between the contacts 42 to 45, inclusive, and the contacts 56 to 59, inclusive. Thus, so long as the time that contact 56 engages the contact 42 during each vibration is too small to provide an average value of current in the energizing winding of the electromagnetic switch 80 sufficient to effect operation of this switch, none of the resistor sections in the secondary motor circuit are short-circuited. Whenever the time of closure becomes great enough, however, the average current flowing through this energizing winding will be sufficient to effect operation of the electromagnetic switch 80 and accordingly the resistor section 76 will be short-circuited. Likewise, the remaining sections will be short-circuited when the average value of the current in the respective energizing windings becomes sufficient to operate the magnetic switches 79, 78, and 77.

As hereinbefore mentioned, the relative positions of the cams 36 to 39, inclusive, may be adjusted by means of the screws 40 and the apertures 40a so as to vary the time sequence of operation of the contacts 56 to 59, inclusive. Furthermore, if it is desired to change the base speed which is to be maintained constant by my improved control device, it is necessary only to remove the cover plate 22 and to replace the gears 19 and 20 by similar gears having a different ratio.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

What I claim as new and desire to secure by Letters Patent of the United States, is:

1. Speed control means for an electric motor, said speed control means comprising a plurality of contacts, means for imparting to said contacts a vibratory movement, a plurality of cooperating contacts respectively associated with said vibratory contacts and normally positioned beyond the range of vibration thereof, means responsive to the speed of said motor for selectively moving said cooperating contacts into and out of said range of vibration to provide selective intermittent engagement of said contacts, the duration of contact engagement during each vibration depending upon the respective positions of said cooperating contacts, said cooperating contacts at one limit of movement being positioned to provide continuous contact engagement, and means controlled by the selective engagement and disengagement of said contacts for controlling the speed of said motor.

2. Speed control means for an electric motor, said speed control means comprising a plurality of contacts, means for imparting to said contacts a vibratory movement, a plurality of cooperating contacts respectively associated with said vibratory contacts and normally positioned beyond the range of vibration thereof, differential means responsive to variations in the speed of said motor from a predetermined speed for selectively moving said cooperating contacts into and out of said range of vibration to provide selective intermittent engagement of said contacts, the duration of contact engagement during each vibration depending upon the respective positions of said cooperating contacts, said cooperating contacts at one limit of movement providing continuous contact engagement, and means controlled by the selective engagement and disengagement of said contacts for maintaining the speed of said motor substantially at said predetermined speed.

3. Speed control means for an electric motor, said speed control means comprising a plurality of contacts, means for imparting to said contacts a vibratory movement, a plurality of cooperating contacts respectively associated with said vibratory contacts and normally positioned beyond the range of vibration thereof, reference means rotatable at a speed corresponding to the speed at which it is desired to operate said motor, means rotatable in accordance with the speed at which said motor is operating, differential means responsive to the difference in the speeds of said rotatable means for selectively moving said cooperating contacts into and out of said range of vibration to provide selective intermittent engagement of said contacts, and means controlled by the selective engagement and disengagement of said contacts for varying the speed of said motor to maintain said motor speed substantially constant.

4. Speed control means for an electric motor, said speed control means comprising a plurality of contacts, means for imparting to said contacts a vibratory movement, a plurality of cooperating contacts respectively associated with said vibratory contacts and normally positioned beyond the range of vibration thereof, reference means rotatable at a speed corresponding to the speed at which it is desired to operate said motor, means rotatable in accordance with the speed of said motor, differential means responsive to differences in the speeds of said rotatable means for selectively moving said co-operating contacts into and out of said range of vibration in predetermined sequence to provide selective intermittent engagement of said contacts, the duration of contact engagement during each vibration depending upon the respective positions of said cooperating contacts, each of said cooperating contacts at one limit of movement providing continuous contact engagement, and means controlled by the selective engagement and disengagement of said contacts for varying the speed of said motor to maintain a substantially constant motor speed.

5. Speed control means for an electric motor, said speed control means comprising a plurality of contacts, means for imparting to said contacts a vibratory movement, a plurality of cooperating contacts respectively associated with said vibratory contacts and normally positioned beyond the range of vibration thereof, a pair of auxiliary motors, means energizing one of said auxiliary motors for rotation at a substantially constant speed, means energizing the other of said auxiliary motors for rotation in accordance with the speed of said electric motor, differential means driven by said auxiliary motors for selectively moving said cooperating contacts into and out of said range of vibration in accordance with variations in the speed of said electric motor, whereby selective intermittent engagement of said contacts is provided, and means controlled by the selective engagement and disengagement of said contacts for varying the speed of said electric motor.

6. Speed control means for an electric motor, said speed control means comprising a plurality of contacts, means for imparting to said contacts a vibratory movement, a plurality of cooperating contacts respectively associated with said vibratory contacts and normally positioned beyond the range of vibration thereof, a pair of auxiliary motors, means energizing one of said auxiliary motors for rotation at a substantially constant speed means energizing the other of said auxiliary motors for rotation in accordance with the speed of said electric motor, differential means driven by said auxiliary motors for selectively moving said cooperating contacts into and out of said range of vibration in accordance with variations in the speed of said electric motor whereby selective intermittent engagement of said contacts is provided, the duration of contact engagement during each vibration depending upon the respective positions of said cooperating contacts, each of said cooperating contacts at one limit of movement providing continuous contact engagement, and means controlled by the selective engagement and disengagement of said contacts for varying the speed of said electric motor.

7. Speed control means for an asynchronous motor having a primary and a secondary winding, said speed control means comprising a plurality of contacts, means for imparting a vibratory movement to said contacts, a plurality of cooperating contacts respectively associated with said vibratory contacts and normally positioned beyond the range of vibration thereof, a pair of auxiliary motors, means energizing one of said auxiliary motors in accordance with the energization of the primary winding of said asynchronous motor, means energizing the other of said auxiliary motors from the secondary circuit of said asynchronous motor, differential means driven by said auxiliary motors for selectively moving said cooperating contacts into and out of said range of vibratory movement in predetermined sequence in accordance with variations in the speed of said asynchronous motor, whereby selective intermittent engagement of said contacts is provided, and means controlled by the selective engagement and disengagement of said contacts for varying the speed of said asynchronous motor.

8. Speed control means for an induction motor having a wound rotor, comprising a plurality of contacts, means for imparting to said contacts a vibratory movement, a plurality of individually movable cooperating contacts respectively associated with said vibratory contacts and normally positioned beyond the range of vibration thereof, an auxiliary motor energizable from the primary circuit of said induction motor for rotation at a constant speed, a second auxiliary motor energizable from the secondary circuit of said induction motor for rotation at a speed corresponding to the speed of said induction motor, differential means driven by said auxiliary motors for selectively moving said cooperating contacts into and out of said range of vibration in predetermined sequence in accordance with variations in the speed of said induction motor to provide selective intermittent engagement of said contacts, the duration of contact engagement during each vibration depending upon the respective positions of said cooperating contacts, each of said cooperating contacts at one limit of movement providing continuous engagement with the associated vibratory contact, and means controlled by said contacts for selectively varying the secondary resistance of said induction motor to maintain a substantially constant speed.

9. Differential control means comprising a differential mechanism including a member movable in accordance with variations in a condition to be controlled, a plurality of contacts, means for imparting to said contacts a vibratory movement, a plurality of individually movable cooperating contacts normally positioned beyond said range of vibration, a plurality of cams driven by said differential member for selectively moving said cooperating contacts into and out of said range of vibration to provide intermittent engagement of said contacts, the duration of contact engagement during each vibration depending upon the respective positions of said cooperating contacts, each of said cooperating contacts being moved by its associated cam to a position providing continuous engagement with its associated vibratory contact before the next cooperating contact is moved into the range of vibration, and means controlled by said contacts for varying said condition to be controlled.

10. Differential control means comprising a differential mechanism including a housing movable in accordance with variations in a condition to be controlled, a plurality of contacts pivotally mounted adjacent said housing, means for imparting to said contacts a vibratory movement, a plurality of individually movable cooperating contacts respectively associated with the said vibratory contacts and normally positioned beyond the range of vibration, a plurality of annular cams secured to said housing for selectively moving said cooperating contacts into and out of said range of vibration in accordance with the movement of said housing to provide intermittent engagement of said contacts, the duration of contact engagement during each vibration depending upon the positions to which said cooperating contacts are moved, and means controlled by the selective engagement and disengagement of said contacts for varying said condition to be controlled.

11. Differential control means comprising a differential mechanism including a housing movable in accordance with variations in a condition to be controlled, a plurality of contacts pivotally mounted adjacent said housing, means for imparting to said contacts a vibratory movement, a plurality of individually movable cooperating contacts respectively associated with said vibratory contacts and normally positioned beyond the range of vibration, a plurality of annular cams secured to said housing for selectively moving said cooperating contacts into and out of said range of vibration in accordance with the movement of said housing to provide intermittent engagement of said contacts, the duration of contact engagement during each vibration depending upon the positions to which said cooperating contacts are moved, said cams being arranged to move each of said cooperating contacts to a position providing continuous contact engagement before the next cooperating contact is moved into said range of vibration, means for adjusting said cams on said housing to vary the sequential movement of said cooperating contacts, and means controlled by the selective engagement and disengagement of said contacts for varying said condition to be controlled.

BENJAMIN W. JONES.